UNITED STATES PATENT OFFICE.

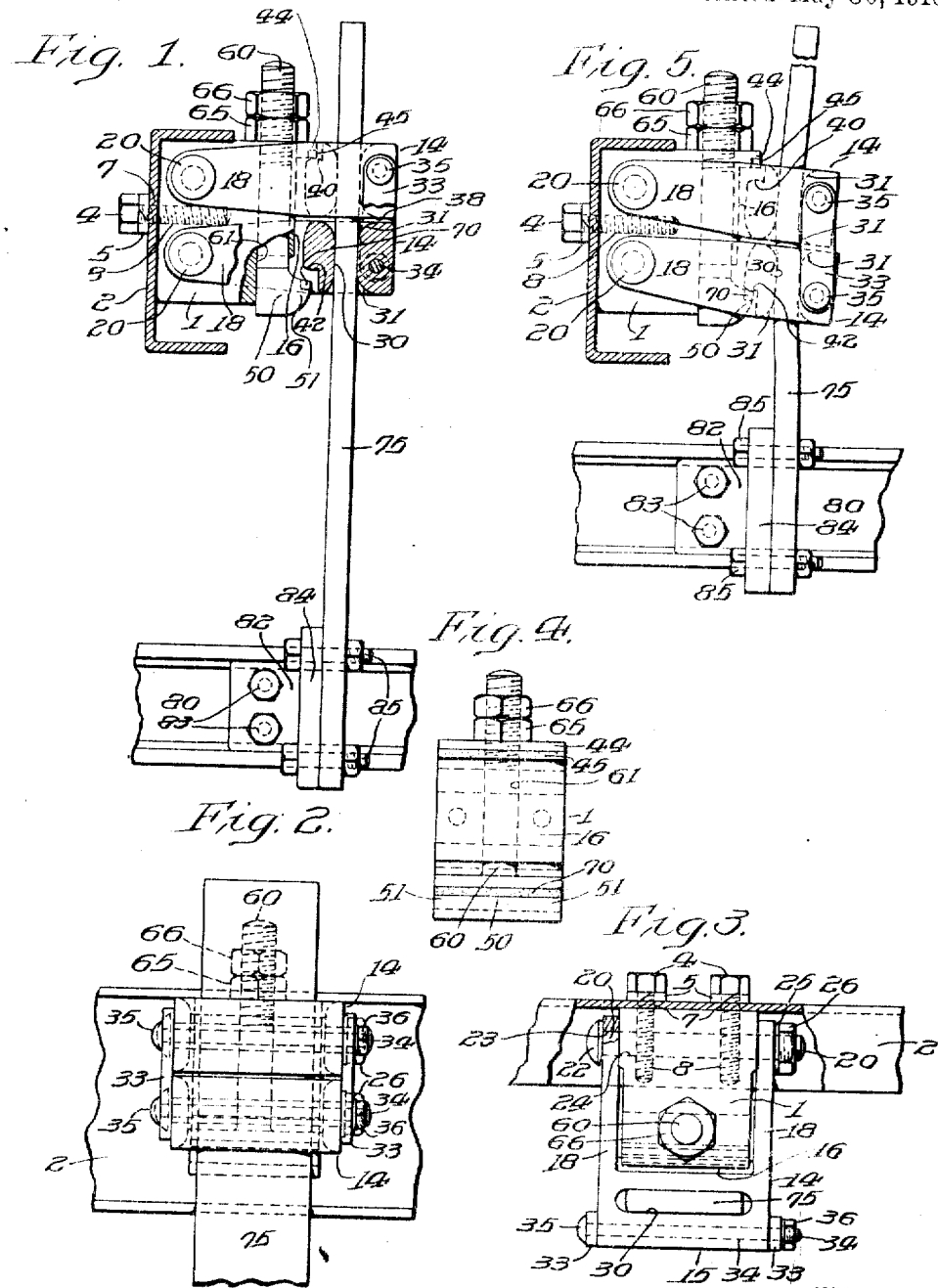

JOHN WARREN WATSON, OF WAYNE, PENNSYLVANIA.

SHOCK-ABSORBING DEVICE.

1,184,802.  Specification of Letters Patent.  Patented May 30, 1916.

Application filed October 14, 1915. Serial No. 55,781.

*To all whom it may concern:*

Be it known that I, JOHN WARREN WATSON, a citizen of the United States, and a resident of Wayne, in the county of Delaware and State of Pennsylvania, have invented a certain new and useful Shock-Absorbing Device, of which the following is a specification, reference being had to the accompanying drawing.

My invention relates to shock absorbing devices for vehicles, and more especially for automobiles and the like in which it is desirable to minimize and modify as far as possible the rebound caused by the action of the springs, by which the body of the vehicle is suspended upon the axles, in assuming their normal position after deflection therefrom through the contact of one or more of the wheels with a road obstacle.

A principal object of my invention, therefore, is to provide a shock absorbing device which shall modify and control the rebound or recoil caused by a spring of the vehicle tending to assume their normal position after deflection, but which shall not hinder or retard the compression or deflection of the springs from normal position due to the contact of one or more of the vehicle wheels with a road obstacle or from other cause; to provide a shock absorbing device which will serve to check the speed with which the axle and frame of a vehicle tend to relatively separate after a downward compression of the springs, and to provide a shock absorbing device in which the amount of resistance exerted against the relative separation of the axle and frame or body of the vehicle caused by the up-throw of the vehicle springs may be adjustably controlled.

Further objects of my invention are to provide a shock absorbing device having the foregoing characteristics, which shall be simple in construction and devoid of intricate and complicated parts; which may be manufactured at a low cost; which shall be capable of ready attachment to practically any type of automobile or other vehicle, and which, when in operation, will not be liable to get out of order, or become inoperative through rough usage or the like.

My invention further includes all of the other various novel objects and features of construction and arrangement hereinafter more definitely specified and described.

In the accompanying drawing in which is illustrated a preferred embodiment of my invention, Figure 1 is a side elevation thereof, partially in vertical section, and showing the device with its various parts in normal position and attached to an automobile; Fig. 2 a front elevation thereof; Fig. 3 a top plan view; Fig. 4 a front elevation of certain parts of the device removed from an automobile, and Fig. 5 a view substantially similar to Fig. 1, and illustrating the operation of the device.

Referring now to that form of the invention shown in the drawing, the same may comprise a suitable support 1 arranged for attachment to the frame or other suitable part of an automobile or other vehicle, the form of support illustrated comprising a substantially rectangular block secured within the channel formed in the frame 2, and rigidly held in position therein in any suitable and convenient manner, as by a plurality of cap screws 4 provided with lock washers 5 arranged to pass through suitable apertures 7 in the frame and into correspondingly interiorly threaded apertures 8 in the support.

A plurality of members 14, of which two are shown in the drawing although any desired number may be utilized, are disposed adjacent the support in superimposed relation, and arranged for suitable movement with respect to the support, each of the members in the preferred embodiment of the invention comprising a transverse portion 15 extending across the front 16 of the support and a pair of rearwardly extending arms 18 loosely embracing the sides of the support and pivoted thereto in any suitable manner, as by a suitable pivot bolt 20, having a head 22, and extending transversely through suitable apertures 23 in the arms and through a suitable aperture 24 in the support, a washer 25 and nut 26 threaded on to the end of the pivot bolt opposite to the head 22 serving to operatively secure the bolt in position, so that each of the said members will be freely movable in a vertical plane about the longitudinal axes of their several respective pivots.

The transverse portion 15 of each of the members 14 is provided with a suitable vertical aperture or slot 30, the sides of which may be curved respectively outwardly as at 31 adjacent the upper and lower faces of the member, and the several members are so arranged with respect to the support 1 that all of the apertures will normally be in substantial alinement, as shown in Fig. 1.

For the purpose of keeping the ends of the members adjacent the apertures in properly respectively spaced relation suitable means are provided, comprising preferably a link or links 33 pivoted to the members by transversely extending pivots 34 passing through suitable apertures adjacent the ends of the links and in the members and each having a head 35 and a nut 36 threaded on to its free end whereby the pivot is maintained in position. The length of the links is preferably such that at all times, and in all positions of the members, a slight clearance 38 will be maintained between the adjacent faces of the members 14 so that the members will never come in contact with each other, and while I find that the arrangement of the links shown is well adapted to attain the desired result of holding the members in spaced relation, any other suitable means adapted therefor may be employed if desired.

The upper inner edge of the transverse portion 15 of the upper member may preferably be cut away to form a shoulder 40 extending transversely between the arms 18, and the lower inner edge of the transverse portion 15 of the lower member may be similarly cut away to form a transversely extending shoulder 42, both of these shoulders being preferably rounded or otherwise suitably curved, as best shown in Fig. 1, and serving, by contact with suitably disposed stops as hereinafter described, to limit the movement of the members during the operation of the device.

For the purpose of limiting the movement of the members 14 in one direction a preferably permanent stop 44 is provided and arranged so that the shoulder 40 of the upper member 14 will contact therewith when the said member is in a horizontal or substantially horizontal position, the stop preferably comprising a suitable laterally and horizontally extending projection adjacent the upper face of the support 1, and, if desired, the stop may be provided with a facing 45 of leather or other sound deadening material suitably secured in position thereon, so as to diminish any possible noise arising from the contact of shoulder 40 therewith.

For the purpose of limiting the movement of the members 14 in the opposite direction during the operation of the device a suitable preferably adjustable stop 50 is provided comprising a laterally extending block having an outwardly projecting toe 51 extending beneath the shoulder 42, the upper face of the toe being preferably curved in conformity therewith. The lower part of the outer face of support 1 may be cut away for the reception of the stop 50 as best shown in Fig. 1, and the stop may preferably be mounted upon a suitable stem 60 projecting upwardly from the stop, passing through a suitable aperture 61 in the support, and extending beyond the upper surface of the support and through the lock nuts 65 and 66 which serve to position the stem, and hence stop 50, at any desired point within the limit of its travel with respect to the support. That portion of the stem projecting beyond the nuts may preferably be made sufficiently long to afford a considerable range of adjustment for the stop.

It will thus be evident that by suitable adjustment of the nuts 65 and 66 the relation of the stop 50, which similarly to the stop 44 may be provided, if desired, with a transversely extending facing 70 of leather or other sound deadening material, to the support may be readily varied, and it will be further evident that if the stop be thus adjusted downwardly the limit of possible movement of the members 14 may be increased, and that if the stop be moved upwardly the limit of movement of the members 14 may be decreased as desired.

A strip of suitable somewhat flexible material 75 is adapted to extend through the apertures 30 in members 14, one end of the strip being secured to a portion of the vehicle, as for example, to the axle 80 thereof when the support is secured to the frame as shown in the drawings, any suitable means, as an L-shaped clip 82 affixed to the axle by means of the bolts 83 and having an outwardly extending portion 84 to which the lower end of the strip 75 is secured by means of the bolts 85 being utilized for this purpose. However, the lower end of the strip 75 may be attached to the desired portion of the vehicle in any other suitable and convenient manner, the means employed for this purpose being preferably adapted to maintain the strip with its width disposed parallel to the apertures 30, it being understood that the support is so positioned that the strip may extend in a substantially straight line through the apertures from its point of attachment to the vehicle. While the strip 75 may be made of any desired material, in practice I find that most satisfactory results are obtained when the strip is formed from heavy leather belting or other substantially similar material, the thickness thereof being just sufficient for the strip to form an easy fit within the apertures 30 so that it may readily slide therethrough when the members 14 extend at right angles, or at substantially right angles, to the axis of the strip, the strip being preferably of sufficient length so that the end thereof which is not attached to the vehicle may freely project for a suitable distance beyond the members 14 when the axle and frame of the vehicle are in normal relation, as shown in Fig. 1, as when the vehicle is at rest upon a level road.

The parts having been constructed as hereinbefore described, and the lower end of the strip attached, for example, to the axle of the vehicle, and the support 1 with its attendant parts secured in fixed relation to the frame 2 in such manner that the strip 75 will extend in a straight line from the axle and through apertures 30 in the members 14, the operation of the device may be described as follows: When the vehicle to which the device is attached is propelled over an uneven surface and one of the wheels encounters an obstruction therein, the axle and frame will approach each other, the springs by which the axle is connected to the frame being correspondingly deflected. During the entire time occupied by this relative movement of the axle toward the frame, the strip 75 will slide freely in the apertures 30 of the members 14, presuming for the moment that the members are at the limit, or substantially at the limit, of their possible movement toward stop 40 and hence at right angles to the axis of the strip 75. As soon as the strip ceases to move up through the apertures, that is, as soon as the axle and frame cease their relative approach, the members 14, under the action of gravity swing slightly downwardly until their further movement is arrested by the contact of the walls of apertures 30 with the sides of the strip. Substantially simultaneously, however, with this movement of the members, the frame and axle tend to violently separate, being forced apart by the springs, which having reached the limit of their momentary deflection immediately tend to assume their normal position, an action, which if not checked or modified, results in an extremely disagreeable up-throw of the body, and frequently in the breaking of one or more of the springs. The first result of this relative movement of the axle and frame away from each other is to draw the members 14, which as stated, have assumed a position in which the sides of the apertures bind slightly against the strip, downwardly along with the strip until shoulder 42 contacts with toe 51 of stop 50, whereby the further movement of the members in the direction in which the strip is now traveling will be prevented, the facing 70 serving to deaden any sound which might otherwise be produced by contact of the parts. The apertures 30 in the position in which the members have now assumed are considerably out of alinement, the amount depending upon the adjusted position of stop 50, and thus form a tortuous passage for the strip, as shown in Fig. 5, through which, during any further relative separation of the frame and axle the strip must be dragged, thereby retarding to any desired degree the speed and violence with which such separation would normally take place. After the axle has reached its normal position and a second obstacle is encountered by the wheel, whereby the axle is again caused to approach the frame, the members will be carried up by the movement of the strip from the position in which they were left at the completion of its previous movement until the passage through the apertures 30 is sufficiently straight to permit the strip to slide freely therethrough, after which the cycle of operations already described will be repeated.

For the most satisfactory operation of the device it is desirable that the members 14 be so arranged as to always bind at least slightly against the strip 75 except during the movement of the axle and frame toward each other, and if the members are of sufficient weight and work freely upon their pivots this result will be attained through the force of gravity unassisted. In some constructions, however, and, of course, if the invention be attached to the vehicle in reversed or inverted position, that is, with the support attached to the axle and the strip to the frame as in certain instances may be desirable, a suitable spring or other means may be arranged to supplement the action of gravity upon the members, or to overcome the same in case the invention be attached to the vehicle in inverted position.

It will be evident if the stop 50 be adjusted downwardly that the permissive disalinement of the apertures will be increased and that in proportion a greater force will be necessary to drag the flexed strip through the apertures when the axle moves away from the frame, and that an adjustment of the stop 50 in the opposite direction with respect to support 1 will result in making the passage formed by the apertures less tortuous and thus in lessening the force necessary to drag the strip therethrough. In consequence substantially any desired amount of friction may be brought into play to impede the relative separation of the axle and frame and thereby to check the upthrow of the body, but no matter what amount of resistance the device be adjusted to exert against the relative movement in one direction of the parts to which it be attached substantially no resistance whatsoever will be exerted against the relative movement of those parts in the opposite direction.

It will further be evident that any wear or compression of strip 75 which would tend to make the same work too freely in the apertures may be readily compensated by adjusting the stop 50 to permit the members 14 to have a correspondingly greater movement so that in their operative position the sinuosity of the passage through which strip 75 must move will be increased, and that by means of such adjustment from time to time a substantially constant amount of resistance to counteract the up-throw of the springs may be secured upon any vehicle to which the invention may be attached. Furthermore, it will be understood that it is preferably intended to utilize one of the devices in connection with each spring upon any given vehicle, although, of course, any desired number of the devices may be utilized upon any given vehicle.

While I have herein described a preferred embodiment of my invention with considerable detail, such embodiment having a form well adapted for attachment to most of the types of automobiles at present in use, I do not desire to limit myself specifically to such embodiment, as it will be evident that various changes and modifications may be made in the design, construction and details of the various parts, and that the same may be modified and arranged to meet the varying conditions encountered in practice and to adapt the device for ready attachment to varying makes of automobiles and other vehicles, and that the invention may be attached to a vehicle in the position shown in the drawing, or in any other desired manner, as for instance, with the support attached to the axle and the strip to the frame, as heretofore described, without departing from the spirit and scope of the invention as defined in the appended claims.

Having thus described my invention, I claim and desire to protect by Letters Patent of the United States:

1. A shock absorbing device comprising a support adapted to be secured to a portion of a vehicle, a plurality of members having apertures and movable with respect to said support, and a strip of material extending through said apertures and adapted to be secured to another portion of said vehicle relatively movable with respect to said first-mentioned portion.

2. A shock absorbing device comprising a support adapted to be secured to the frame of a vehicle, a plurality of members having normally alined apertures said members being movable with respect to said support, means for limiting the movement of said members, and a strip of flexible material extending through said apertures and adapted to be secured to the axle of said vehicle.

3. A shock absorbing device comprising a support adapted for attachment to a portion of a vehicle, a plurality of members adjacent said support and horizontally pivoted thereon to move in a vertical plane, a fixed stop operative to limit the movement of said members in one direction, an adjustable stop operative to limit the movement of said members in the opposite direction, and a strip of material extending through said members and adapted to be attached to another portion of the vehicle relatively movable with respect to said first-mentioned portion.

4. A shock absorbing device comprising a support adapted for attachment to the frame of a vehicle, a plurality of members pivoted to said support, each of said members having an aperture, a strip of flexible material adapted for attachment to the axle of said vehicle and to extend through said apertures, and adjustable means to limit the movement of said members with respect to said support during a movement of said strip in the one direction past said support.

5. A shock absorbing device comprising a support adapted for attachment to a vehicle frame, a plurality of slotted members embracing said support and pivoted thereto for vertical movement about horizontal axes, a fixed stop operative to limit the movement of said members in one direction, an adjustable stop operative to limit the movement of said members in the opposite direction, and a strip of flexible material attached to the axle of the vehicle and freely movable through said apertures toward said first-mentioned stop and operative to bind in said apertures when moved toward said last-mentioned stop.

6. A shock absorbing device comprising a support adapted for attachment to one portion of a vehicle, a strip of material adapted to be attached to another relatively movable portion of said vehicle, and means angularly movable with respect to said support and through which said strip extends operative to permit said strip to move freely past said support in one direction, and to retard the movement of said strip past said support in an opposite direction.

7. A shock absorbing device comprising a support adapted for attachment to one part of a vehicle, a strip of material adapted for attachment to another relatively movable part of the vehicle, and extending adjacent said support, a plurality of members movable with respect to said support and having openings through which said strip is adapted to extend, said members being operative to permit said strip to slide freely through said openings when said members are in one position, and to retard the passage of said strip through said openings when said members are in another position.

8. A shock absorbing device comprising a strip of material adapted to be secured to a portion of a vehicle, and a plurality of members in angularly movable relation with another relatively movable portion of the vehicle and embracing said strip, said members being operative to permit a free movement of said strip as said relatively movable portions of the vehicle approach each other, and to retard the movement of said strip as said portions of the vehicle move away from each other.

9. A shock absorbing device comprising a strip of flexible material adapted for attachment to a vehicle axle and to extend substantially vertically upwardly therefrom, a plurality of members each comprising a slot through which said strip is adapted to extend, means to maintain said members in relatively spaced relation, means to secure said members in movable relation with the frame of the vehicle, and an adjustable stop to limit the downward movement of said members, said members being operative to permit the free upward movement of said strip through said slots, and to retard the downward movement of said strip through said slots.

10. Mechanism operative to retard the relative movement between two bodies in one direction without retarding their relative movement in the opposite direction and comprising a plurality of movable members having openings, a support for said members fixed with respect to one of said bodies, a step operative to limit the movement of said members, and a member attached to the other of said bodies and slidably operative through said openings.

11. A mechanism for retarding the relative movement between two bodies in one direction without interfering with their relative movement in the opposite direction, comprising a plurality of movable members having openings and a support for said members which is fixed with relation to one of said bodies, an adjustable stop to limit the movement of said members, and a flexible member attached to the other of said bodies and slidably operative through the openings in the movable members.

12. Mechanism for retarding the relative movement between the sprung and unsprung portions of a vehicle in one direction without interfering with their relative movement in the opposite direction comprising a plurality of movable members each provided with an opening and a support for said members fixed with relation to one of said portions, stops to limit the movement of said members, and a flexible member attached to the other of said portions and slidably operative through the openings in the movable members.

13. A shock absorbing device comprising a plurality of members maintained in movable relation with one part of a vehicle and each provided with an opening, a flexible strip adapted for attachment to another relatively movable part of said vehicle and slidable through said openings, and means to cause said strip to bind in said openings to retard the movement of said strip therethrough during the relative movement of said parts of the vehicle in one direction and to permit said strip to slide freely through said openings during the relative movement of said parts in the opposite direction.

14. A shock absorbing device comprising a support adapted for attachment to a portion of a vehicle, a plurality of slotted members adjacent said support and pivoted thereto for vertical movement about horizontal axes, a fixed stop operative to limit the movement of said members in one direction, an adjustable stop operative to limit the movement of said members in the opposite direction, and a strip of material extending through said slots and adapted to be attached to another portion of the vehicle relatively movable with respect to said first-mentioned portion.

In witness whereof, I have hereunto set my hand this 13th day of October, A. D. 1915.

JOHN WARREN WATSON.

portions of the vehicle approach each other, and to retard the movement of said strip as said portions of the vehicle move away from each other.

9. A shock absorbing device comprising a strip of flexible material adapted for attachment to a vehicle axle and to extend substantially vertically upwardly therefrom, a plurality of members each comprising a slot through which said strip is adapted to extend, means to maintain said members in relatively spaced relation, means to secure said members in movable relation with the frame of the vehicle, and an adjustable stop to limit the downward movement of said members, said members being operative to permit the free upward movement of said strip through said slots, and to retard the downward movement of said strip through said slots.

10. Mechanism operative to retard the relative movement between two bodies in one direction without retarding their relative movement in the opposite direction and comprising a plurality of movable members having openings, a support for said members fixed with respect to one of said bodies, a step operative to limit the movement of said members, and a member attached to the other of said bodies and slidably operative through said openings.

11. A mechanism for retarding the relative movement between two bodies in one direction without interfering with their relative movement in the opposite direction, comprising a plurality of movable members having openings and a support for said members which is fixed with relation to one of said bodies, an adjustable stop to limit the movement of said members, and a flexible member attached to the other of said bodies and slidably operative through the openings in the movable members.

12. Mechanism for retarding the relative movement between the sprung and unsprung portions of a vehicle in one direction without interfering with their relative movement in the opposite direction comprising a plurality of movable members each provided with an opening and a support for said members fixed with relation to one of said portions, stops to limit the movement of said members, and a flexible member attached to the other of said portions and slidably operative through the openings in the movable members.

13. A shock absorbing device comprising a plurality of members maintained in movable relation with one part of a vehicle and each provided with an opening, a flexible strip adapted for attachment to another relatively movable part of said vehicle and slidable through said openings, and means to cause said strip to bind in said openings to retard the movement of said strip therethrough during the relative movement of said parts of the vehicle in one direction and to permit said strip to slide freely through said openings during the relative movement of said parts in the opposite direction.

14. A shock absorbing device comprising a support adapted for attachment to a portion of a vehicle, a plurality of slotted members adjacent said support and pivoted thereto for vertical movement about horizontal axes, a fixed stop operative to limit the movement of said members in one direction, an adjustable stop operative to limit the movement of said members in the opposite direction, and a strip of material extending through said slots and adapted to be attached to another portion of the vehicle relatively movable with respect to said first-mentioned portion.

In witness whereof, I have hereunto set my hand this 13th day of October, A. D. 1915.

JOHN WARREN WATSON.

---

It is hereby certified that in Letters Patent No. 1,184,802, granted May 30, 1916, upon the application of John Warren Watson, of Wayne, Pennsylvania, for an improvement in "Shock-Absorbing Devices," an error appears in the printed specification requiring correction as follows: Page 5, line 26, claim 10, for the word "step" read *stop;* and that the said Letters Patent should be read with this correction therein that the same may conform to the record of the case in the Patent Office.

Signed and sealed this 27th day of June, A. D., 1916.

[SEAL.]
R. F. WHITEHEAD,
*Acting Commissioner of Patents.*

It is hereby certified that in Letters Patent No. 1,184,802, granted May 30, 1916, upon the application of John Warren Watson, of Wayne, Pennsylvania, for an improvement in "Shock-Absorbing Devices," an error appears in the printed specification requiring correction as follows: Page 5, line 26, claim 10, for the word "step" read *stop;* and that the said Letters Patent should be read with this correction therein that the same may conform to the record of the case in the Patent Office.

Signed and sealed this 27th day of June, A. D., 1916.

[SEAL.]

R. F. WHITEHEAD,

*Acting Commissioner of Patents.*